US008000272B2

(12) United States Patent
Gao et al.

(10) Patent No.: US 8,000,272 B2
(45) Date of Patent: Aug. 16, 2011

(54) UPLINK SCHEDULING GRANT FOR TIME DIVISION DUPLEX WITH ASYMMETRIC UPLINK AND DOWNLINK CONFIGURATION

(75) Inventors: Adele Gao, Beijing (CN); Yuan Zhu, Beijing (CN); Haiming Wang, Beijing (CN); Dajie Jiang, Beijing (CN)

(73) Assignee: Nokia Corporation, Espoo (FI)

( * ) Notice: Subject to any disclaimer, the term of this patent is extended or adjusted under 35 U.S.C. 154(b) by 659 days.

(21) Appl. No.: 11/891,901

(22) Filed: Aug. 14, 2007

(65) Prior Publication Data

US 2009/0046605 A1  Feb. 19, 2009

(51) Int. Cl.
*H04J 3/00* (2006.01)
*H04W 4/00* (2009.01)
*H04B 7/212* (2006.01)
*H04L 12/43* (2006.01)
*H04J 3/06* (2006.01)

(52) U.S. Cl. ........ 370/280; 370/314; 370/442; 370/458; 370/509

(58) Field of Classification Search .................. 370/280, 370/314, 321, 328, 329, 330, 336, 337, 342, 370/347, 442, 458, 498, 508, 509
See application file for complete search history.

(56) References Cited

U.S. PATENT DOCUMENTS

| | | | | |
|---|---|---|---|---|
| 5,796,726 | A  * | 8/1998 | Hassan et al. ................. | 370/322 |
| 6,807,154 | B1 * | 10/2004 | Malmgren et al. ............ | 370/252 |
| 2004/0057407 | A1 * | 3/2004 | Balachandran et al. ...... | 370/336 |
| 2005/0201319 | A1 * | 9/2005 | Lee et al. ...................... | 370/321 |
| 2007/0135172 | A1 * | 6/2007 | Lysejko et al. ............. | 455/562.1 |
| 2007/0149206 | A1 * | 6/2007 | Wang et al. ................... | 455/450 |
| 2007/0189205 | A1 * | 8/2007 | Terry et al. .................... | 370/328 |
| 2007/0201350 | A1 * | 8/2007 | Papasakellariou ............ | 370/208 |
| 2007/0250742 | A1 * | 10/2007 | Kowalski ....................... | 714/701 |
| 2007/0258540 | A1 * | 11/2007 | Ratasuk et al. ................ | 375/267 |
| 2008/0144545 | A1 * | 6/2008 | Stanwood et al. ............. | 370/295 |
| 2009/0175235 | A1 * | 7/2009 | Spinar et al. .................. | 370/329 |

OTHER PUBLICATIONS

LG Electronics, "Overall Control Signaling Structure for Generic LTE TDD" by 3GPP TSG RAN WG1 LTE TDD Ad Hoc, Agenda 3.13, published on Apr. 17-20, 2007 in Beijing China. Document name: R1-071848.*
Motorola: "Downlink Control Signalling for E-UTRA TDD" 3Gpp TSG RAN1 LTE TDD ADHOC; R1-071868, Apr. 17, 2007, XP002515269 Beijing, China. Retrieved from the Internet: URL: www.3gpp.org>.

(Continued)

*Primary Examiner* — Xavier Szewai Wong
(74) *Attorney, Agent, or Firm* — Harrington & Smith

(57) ABSTRACT

Signalling uplink and downlink scheduling grants for a plurality of subframes in a time division duplex frame is addressed. In one aspect the allocated uplink subframes are divided into groups, so the number of groups equals the number of downlink subframes being allocated. Uplink grants for the groups are sent with the downlink grants, and for those groups that have more than one uplink subframe, the grant message also indicates which uplink subframes are included in that group. In another aspect there are two sets of grant messages, one for the uplink subframes and one for the downlink subframes. Each of the uplink grant messages is sent on a different uplink grant message, and there is a one-to-one correspondence between the uplink grant channel and the uplink subframe being scheduled by the grant. That correspondence may also be signalled with the grant messages.

26 Claims, 7 Drawing Sheets

OTHER PUBLICATIONS

Nokia: "ACK/NACK Channel Structure in E-UTRA TDD downlink" 3Gpp TSG RAN1 TDD ADHOC; R1-071900, [Online] Apr. 17, 2007, XP002515270, Retrieved from the Internet: URL: www.3gpp.org>.

3GPP TR 25.814 V7.1.0 (Sep. 2006), "Physical Layer Aspects for Evolved Universal Terrestrial Radio Access (UTRA)", pp. 1-132.

RP-070271, Status Report RAN WG1 to TSG-RAN #36; Busan, Korea; May 28-Jun. 1, 2007, pp. 1-17.

3GPP TSG RAN 1 LTE TDD AdHoc, "Downlink Control Signalling for E-UTRA TDD", Beijing, China; Apr. 17-20, 2007, 3 pp.

3GPP TSG RAN WG1 LTE TDD AD Hoc, "TTI Indication for LTE TDD", Beijing China, Apr. 17-20, 2007, pp. 1-4.

3GPP TSG RAN WG1 LTE TDD AD Hoc, "Downlink control channel structure for TDD with alternative frame structure", Beijing, China Apr. 17-20, 2007, 5 pgs.

\* cited by examiner

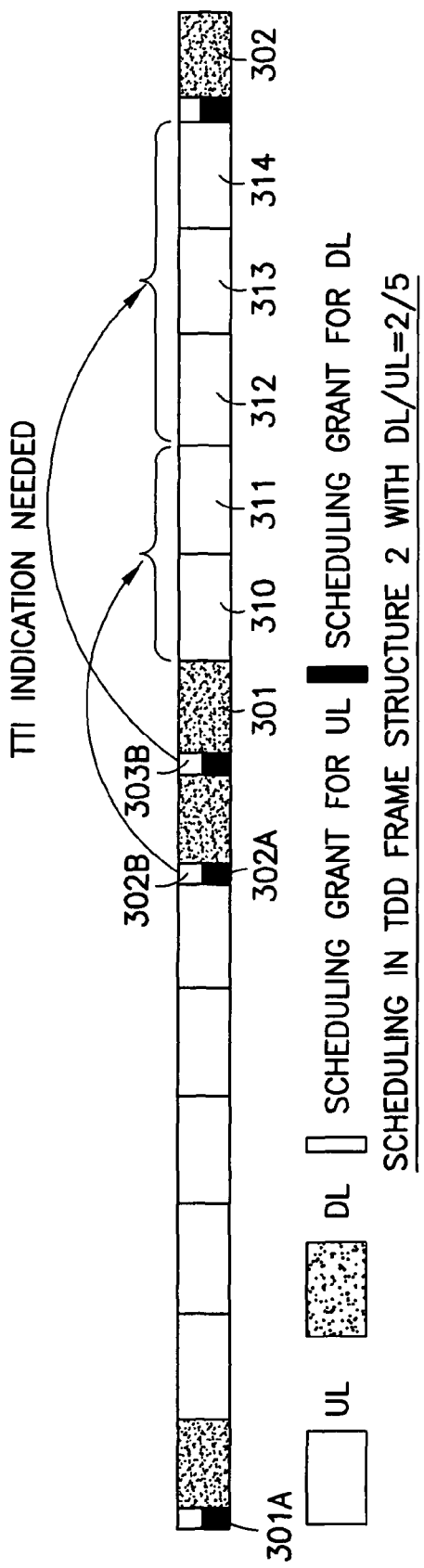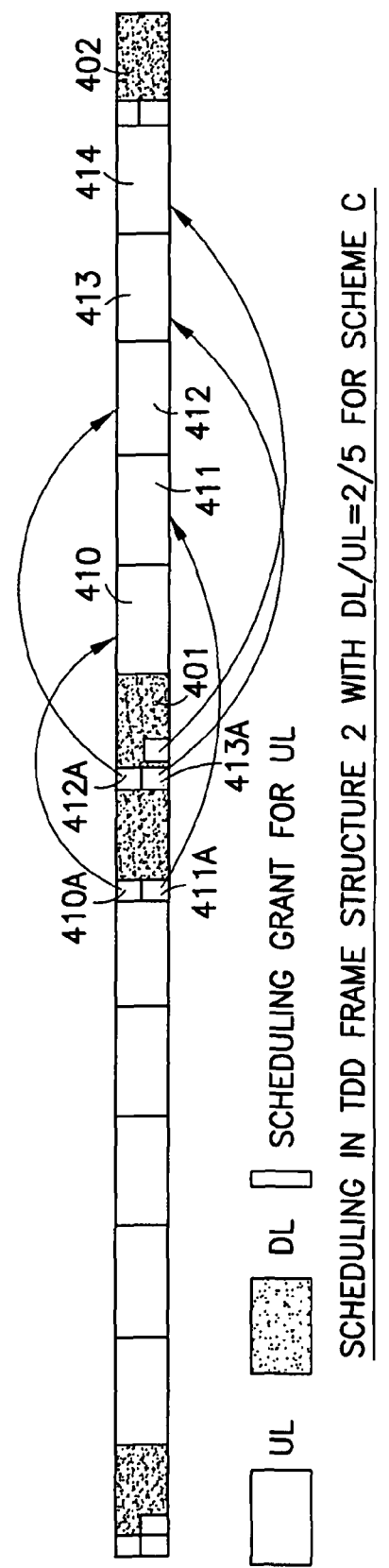

UPLINK SCHEDULING GRANT FOR TIME DIVISION DUPLEX WITH ASYMMETRIC UPLINK AND DOWNLINK CONFIGURATION

TECHNICAL FIELD

The teachings herein relate generally to wireless networks that allocate uplink and downlink resources to mobile equipment, particularly where the allocation is or may be asymmetric as between the uplink and downlink subframe resources being allocated.

BACKGROUND

The following abbreviations and terms are herewith defined:
3GPP third generation partnership project
CCFI control channel format indicator (alternatively Cat0)
DL: downlink
Node B base station, or evolved node B of an LTE system
E-UTRAN evolved UTRAN
FDD: frequency division duplex
FS1: frame structure 1
FS2: frame structure 2
LTE long term evolution of 3GPP
MCS modulation and coding scheme
Node B base station or similar network access node
OFDM orthogonal frequency division multiplex
TDD time division duplex
UE user equipment (e.g., mobile equipment/station)
UL uplink
UMTS universal mobile telecommunications system
UTRAN UMTS terrestrial radio access network
VOIP voice over Internet protocol IP 3GPP is standardizing the long-term evolution (LTE) of the radio-access technology which aims to achieve reduced latency, higher user data rates, improved system capacity and coverage, and reduced cost for the operator. The current understanding of LTE relevant to these teachings may be seen at 3GPP TR 25.814 (v7.1.0, 2006-09) entitled PHYSICAL LAYER ASPECTS OF EVOLVED UTRA and herein incorporated by reference. Both FDD and TDD are considered in LTE. Due to their difference in frame structure and duplex mode, some designs for FDD and TDD can be different (see section 6.2 et seq. of TR 25.814). As stated at section 6.2.1, "E-UTRA, when operating in TDD mode-of-operation, may face additional interference scenarios, compared to when operating in FDD mode of operation. More specifically, direct UE-to-UE and BS-to-BS interference may occur both within one carrier and between neighbour carriers." As LTE develops it is clear that there are to be some differences as between the FDD and TDD modes of operation.

Some general principles of scheduling in E-UTRAN are recited at section 7.2.1 of TR 25.814. The Node B scheduler dynamically controls which time/frequency resources, such as subframes, are allocated to a certain user at a given time. Downlink control signalling informs UE(s) what resources/subframes and respective transmission formats have been allocated. The scheduler can instantaneously choose the best multiplexing strategy from the available methods; e.g. frequency localized or frequency distributed transmission. The flexibility in selecting subframes and multiplexing UEs will influence the available scheduling performance. Scheduling is tightly integrated with link adaptation and hybrid automatic repeat request HARQ.

In FDD, it has been agreed that there are at most 3 OFDM symbols in each TTI that are reserved for control signalling. Consider for this description that a TTI is one subframe. Those 3 OFDM symbols are to include DL and UL scheduling grants as well as CCFI/Cat0 information that gives the format of the control channel. The CCFI/Cat0 is length 2 bits and indicates how many OFDM symbols are used for control (see page 12 of document RP-070271, STATUS REPORT RAN WG1 TO TSG-RAN #36; Busan, Korea; 28 May-1 June 2007). The size of the DL control resource limits the number of UEs that can be scheduled. A rough calculation shows that if 3 OFDM symbols are reserved for control in each DL subframe, there are 8DL and 7UL UEs can be scheduled per TTI in a system having a 10 msec radio frame as in LTE. However, in the TDD system, since the DL and UL configuration can be asymmetric, more limitations exist in the scheduling and so the 8DL/7UL limit may not be attainable in certain instances due to the asymmetry that may be present. This invention addresses some of those problems in TDD UL scheduling, which by the above framework must be done in conjunction with the DL scheduling.

As further background, there are currently two different frame formats in LTE, previously known as a fixed frame structure (one 10 msec radio frame=two 5 msec frames each having seven traffic timeslots or subframes) and generic (to allow backward compatibility). These are currently referred to as frame structure 1 FS1 and frame structure 2 FS2. The TDD mode of LTE may have asymmetric DL and UL subframe allocation for both FS1 and FS2. For example, there may exist a TDD FS2 with 6DL subframes and 1UL subframe being allocated in a 5 msec frame. Given the above considerations, different approaches become available to deal with the asymmetry problem. One option is to constraint the UL scheduling grant for the UL subframe in the first DL subframe. Another option is to allow the UL scheduling grant for the UL subframe in more than the first DL subframe. And that choice must also enable one to send the UL scheduling grant for a TDD FS2 with an opposite symmetry, for example scheduling 5UL subframes and 2 DL subframes. The mapping becomes quite difficult, especially considering the limits on scheduling overhead already agreed in LTE.

Two proposals to solve the UL scheduling grant problem for the asymmetric scheduling problem is in document R1-071868, entitled DOWNLINK CONTROL SIGNALLING FOR E-UTRAN TDD (3GPP TSG RAN1 LTE TDD AdHoc; Beijing, China; Apr. 17-20, 2007; by Motorola). Where there are less UL subframes than DL subframes, there is simply a one-to-one correspondence so the $i^{th}$ UL subframe is allocated in the ith DL subframe. One of those proposals for more UL subframes than DL subframes is to use radio resource control RRC signaling on the synchronization channel DL-SCH to schedule UEs for UL resources that do not match one-to-one with DL resources. That paper admits that this is a high price in UL scheduling grant overhead. The other of those proposals is to create additional 'control regions' in some DL subframes that are associated with UL subframes that do not match one-to-one with other of the DL subframes, with a map of the association sent on a broadcast channel D-BCH. This is also seen as a higher overhead than would be ideal.

Another proposal is set forth in document R1-071882, entitled TTI INDICATION FOR LTE TDD (3GPP TSG RAN1 LTE TDD AdHoc; Beijing, China; Apr. 17-20, 2007; by CATT). This proposes to use explicit TTI indications in the form of a bitmap in the control signaling format to denote the location of subframes being allocated (this paper also makes alternative proposals). As with R1-071868, this proposal is seen to be high in control overhead, and R1-071882 does not appear to address how to minimize that overhead.

What is needed in the art is a bandwidth efficient way to schedule UL and DL resources in the LTE system when the number of DL and UL subframes being scheduled by the same Node B in different frames are asymmetric in both directions.

SUMMARY

In accordance with one embodiment of the invention is a method that, for a plurality of subframes in a time division duplex frame, allocates a number N of the subframes as downlink subframes and a remaining number greater than N of the subframes as uplink subframes. The uplink subframes are divided into N groups, and then N grant messages are wirelessly sent to a plurality of user equipments. Each of the grant messages includes a scheduling grant for one of the downlink subframes and a scheduling grant for one of the groups of uplink subframes. In one particular embodiment, for each of the groups that includes more than one of the uplink subframes and only for those groups, the grant message has an indicator that indicates which of the uplink subframes are in the group.

In accordance with another embodiment of the invention is a program of machine-readable instructions, tangibly embodied on a computer readable memory and executable by a digital data processor, to perform actions directed toward scheduling user equipments for wireless resources. In this embodiment the actions include, for a plurality of subframes in a time division duplex frame, allocating a number N of the subframes as downlink subframes and a remaining number greater than N of the subframes as uplink subframes, dividing the uplink subframes into N groups, then wirelessly sending to a plurality of user equipments N grant messages. Each of the grant messages includes a scheduling grant for one of the downlink subframes and a scheduling grant for one of the groups of uplink subframes.

In accordance with another embodiment of the invention is a device that includes a scheduler, a processor coupled to a computer readable memory and to the scheduler, and a transmitter coupled to the processor. For a plurality of subframes in a time division duplex frame, the scheduler is configured to allocate a number N of the subframes as downlink subframes and a remaining number greater than N of the subframes as uplink subframes. The processor is configured to divide the uplink subframes into N groups. And the transmitter is configured to wirelessly send to a plurality of user equipments N grant messages. Each of the grant messages includes a scheduling grant for one of the downlink subframes and a scheduling grant for one of the groups of uplink subframes.

In accordance with another embodiment of the invention is a device that includes scheduling means, processing means coupled to a computer readable memory and to the scheduling means, and transmitting means coupled to the processing means. For a plurality of subframes in a time division duplex frame, the scheduling means is for allocating a number N of the subframes as downlink subframes and a remaining number greater than N of the subframes as uplink subframes. The processing means is for dividing the uplink subframes into N groups. The transmitting means is for wirelessly sending to a plurality of user equipments N grant messages. Each of the grant messages includes a scheduling grant for one of the downlink subframes and a scheduling grant for one of the groups of uplink subframes. For each of the groups that include more than one of the uplink subframes, the grant message includes an indicator that indicates which of the uplink subframes are in the group. In a particular embodiment, the scheduling means includes a software program stored on the memory, the processing means includes a digital data processor, and the transmitting means includes a transmitter.

In accordance with another embodiment of the invention is a method that includes, for a plurality of subframes in a time division duplex frame, allocating some of the subframes as downlink subframes and others of the subframes as uplink subframes, and wirelessly sending to a plurality of user equipments a plurality of grant messages. Each of a first set of the grant messages includes a scheduling grant for one of the downlink resources, and each of a second set of the grant messages includes a scheduling grant for one of the uplink resources, and further each of second set of grant messages is sent over a different one of a plurality of logical uplink grant channels.

In accordance with another embodiment of the invention is a program of machine-readable instructions, tangibly embodied on a computer readable memory and executable by a digital data processor, to perform actions directed toward scheduling user equipments for wireless resources. In this embodiment the actions include, for a plurality of subframes in a time division duplex frame, allocating some of the subframes as downlink subframes and others of the subframes as uplink subframes, and then wirelessly sending to a plurality of user equipments a plurality of grant messages. Each of a first set of the grant messages includes a scheduling grant for one of the downlink resources and each of a second set of the grant messages includes a scheduling grant for one of the uplink resources. Furthermore, each of second set of grant messages is sent over a different one of a plurality of logical uplink grant channels.

In accordance with another embodiment of the invention is a device that includes a scheduler, a processor, a memory and a transmitter. The scheduler is coupled to the processor and to the memory and together they are configured, for a plurality of subframes in a time division duplex frame, to allocate some of the subframes as downlink subframes and others of the subframes as uplink subframes. The transmitter is configured to wirelessly send to a plurality of user equipments a plurality of grant messages. Each of a first set of the grant messages includes a scheduling grant for one of the downlink subframes and each of a second set of the grant messages includes a scheduling grant for one of the uplink subframes. Further, each of second set of grant messages is sent over a different one of a plurality of logical uplink grant channels.

In accordance with another embodiment of the invention is a device that includes scheduling means and transmitting means. For a plurality of subframes in a time division duplex frame, the scheduling means is for allocating some of the subframes as downlink subframes and others of the subframes as uplink subframes. The transmitting means is for wirelessly sending to a plurality of user equipments a plurality of grant messages. Each of a first set of the grant messages includes a scheduling grant for one of the downlink subframes and each of a second set of the grant messages includes a scheduling grant for one of the uplink subframes. Further, each of second set of grant messages is sent over a different one of a plurality of logical uplink grant channels. In a particular embodiment, the scheduling means includes a processor coupled to a memory that embodies a computer executable program, and the transmitting means includes at least a transmitter portion of a transceiver.

These and other aspects of the invention are detailed more particularly below.

BRIEF DESCRIPTION OF THE DRAWINGS

The foregoing and other aspects of these teachings are made more evident in the following Detailed Description, when read in conjunction with the attached Drawing Figures, wherein:

FIG. 3A is similar to FIG. 2 but illustrating an allocation of two downlink subframes and five uplink subframe (DL<UL) according to the aspect of the invention used in FIG. 2.

FIG. 4 is similar to FIG. 3A but illustrating only the uplink allocation according to still another aspect of the invention.

DETAILED DESCRIPTION

Figure 1:
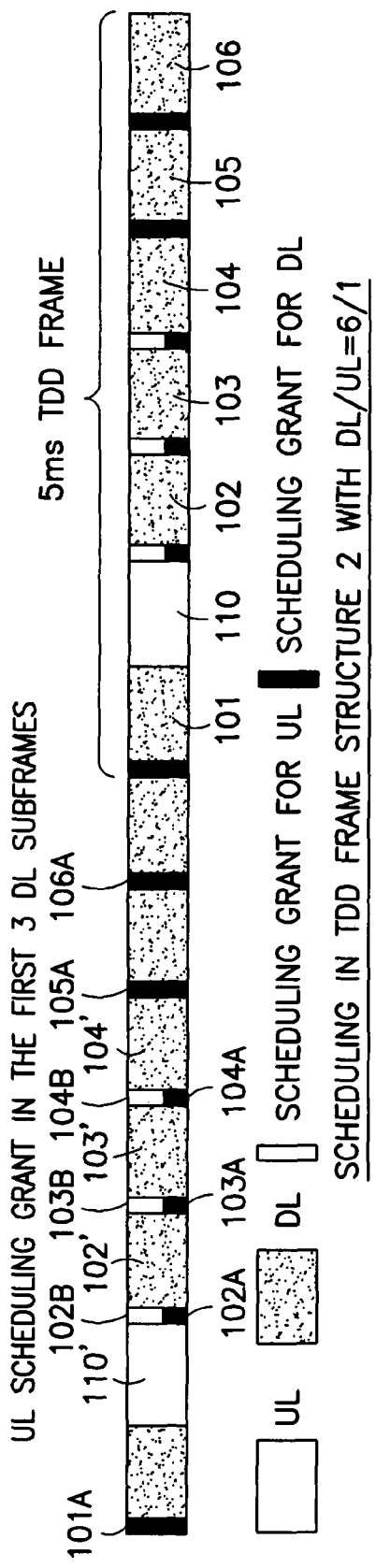
FIG. 1 is a schematic diagram of a TDD frame structure (FS2) illustrating how six downlink resources and one uplink subframe (DL>UL) are allocated according to one aspect of the invention.

Embodiments of this invention relate to asymmetry in both directions, where there is a greater number of DL than UL subframes allocated/scheduled, and also where there is a greater number of UL than DL subframes allocated/scheduled. As noted above, in E-UTRAN the scheduling grants for the UL subframes occurs within the DL subframes. The discussion below is in terms of scheduling grants for subframes/timeslots within a frame where the scheduled TDD resources/subframes are consecutive.

The case of more UL than DL subframes being scheduled is the more challenging, and two approaches are detailed below. In a first aspect of the invention where DL<UL, the Node B scheduler will create or follow a mapping between the DL subframes and the UL subframes, since control signalling for the scheduling grants are in the DL subframes but they schedule also the UL subframes. Implicit mapping is seen to be too inflexible and as seen above in the background section, entails quite a bit of signaling overhead and complexity when more UL subframes are allocated than DL subframes. In this aspect of the invention, a TTI indicator in the resource grant maps explicitly to the granted UL subframe. But to save on control signalling, the UL subframes are grouped, so the TTI indicator in one scheduling grant will map to more than one UL subframe of the overall frame. The number of groups into which all of the scheduled UL subframes are divided is equal to the number of DL subframes being scheduled in that same TTI, so the number of groups equals the number of DL subframes in the frame. So in this first aspect the UL subframes are divided into N groups, where N is the number of DL subframes, and the scheduling grant for the ith group is in the ith DL subframe. This is advantageous when the number of UL subframes is greater than the number of DL subframes in the frame. In a second aspect of the invention, there is a one-to-one mapping between grant and UL subframe, but the coupling between DL and UL grants that was detailed above in the background section is dissolved. In this second aspect, there is a logical channel defined for a UL subframe, and scheduling grants given on that logical channel are grants for the UL subframe associated with that logical channel. Said another way, in this second aspect the control signaling resource for the UL subframes is divided into M parts, where each part is a logical control channel for UL scheduling grants and where M is the number of UL subframes in the frame. Then, the scheduling grant for the ith UL subframe is sent in the ith logical control channel, and this applies for any ratio of DL to UL subframe.

Companion to the above aspects of the invention that are appropriate to the case where the number of granted DL subframes is less than the number of allocated UL subframes are two solutions for the case where the number of granted DL subframes is greater than or equal to the number of allocated UL subframes. As noted above for the second aspect, mapping logical channels on which the UL scheduling grant is sent to a UL subframe being granted is readily extended to the DL>UL and DL=UL cases. Alternatively for either aspect above, a first option is an implicit one-to-one mapping between DL subframe in which a UL scheduling grant is received and UL subframe being allocated so that a UL scheduling grant on an ith DL subframe maps to an ith UL subframe. A second option is to allow the UL scheduling grant for one UL TTI to be indicated in more than one DL subframe, and use an explicit TTI indication in the UL scheduling grant only when necessary. A novel arrangement or pattern of the CCFI/Cat0 bits is exploited to indicate whether or not there is a UL scheduling grant in the ith DL subframe. This enables the UEs being scheduled to avoid blind detection, looking for their scheduling grant that is not there. When there is a UL scheduling grant and there are multiple UL subframes, the explicit TTI indication can be used to tell that the scheduling grant is for which UL subframe.

Now are detailed specifics of the above aspects of the invention as well as options for how the opposite symmetry (DL>UL) may be handled. While the term subframe is used in explaining the examples below, its meaning is not limited to any particular wireless protocol and may be defined differently in different networks. First are detailed the first and second aspects noted above that are appropriate to the case where the Node B schedules more UL subframes than DL subframes. Then the options for how to treat the case where the number of granted DL subframes is greater than or equal to the number of UL subframes being granted.

As summarized above, where a TDD frame structure has more UL subframes than DL subframes, such as TDD FS2 with one DL subframe and six UL subframes (DL/UL=1/6, or 2/5 or 3/4), and also such as TDD FS1 with four DL subframes and six UL subframes (DL/UL=4/6, or 3/7 or 2/8), there is in the first aspect of the invention a TTI indication that maps the UL scheduling grant explicitly to a UL subframe. While this may be done by implicit mapping, this is seen to lack flexibility to a degree that makes it less favored than other approaches. Most simply, a sufficiently long TTI indication would assure that any number of UL subframes could be mapped. For example, three bits are sufficient for this TTI index is using single TTI scheduling. Five bits would be sufficient for this TTI index if multi-TTI scheduling is allowed in the TDD FS2 (with 2DL and 5 UL subframes). However many bits, there are a different number of bits indicating single TTI scheduling versus multi-TTI scheduling.

Now, the explicit TTI mapping for the case where DL<UL becomes costly in terms of bandwidth. To reduce that signaling overhead, the UL subframes are divided into groups, say N groups where N is an integer equal to the number of DL subframes in the TDD frame. Because in this instance DL<UL, then at least one of the N groups must include more than one of the UL subframes. The scheduling grant for the UL subframes in the ith group is sent in the ith DL subframe. Then in each UL scheduling grant the TTI indication is shortened as compared to the 3 or 5 bits noted above. As will be detailed below, in some DL subframes the TTI indication can even be avoided altogether.

Figure 2:
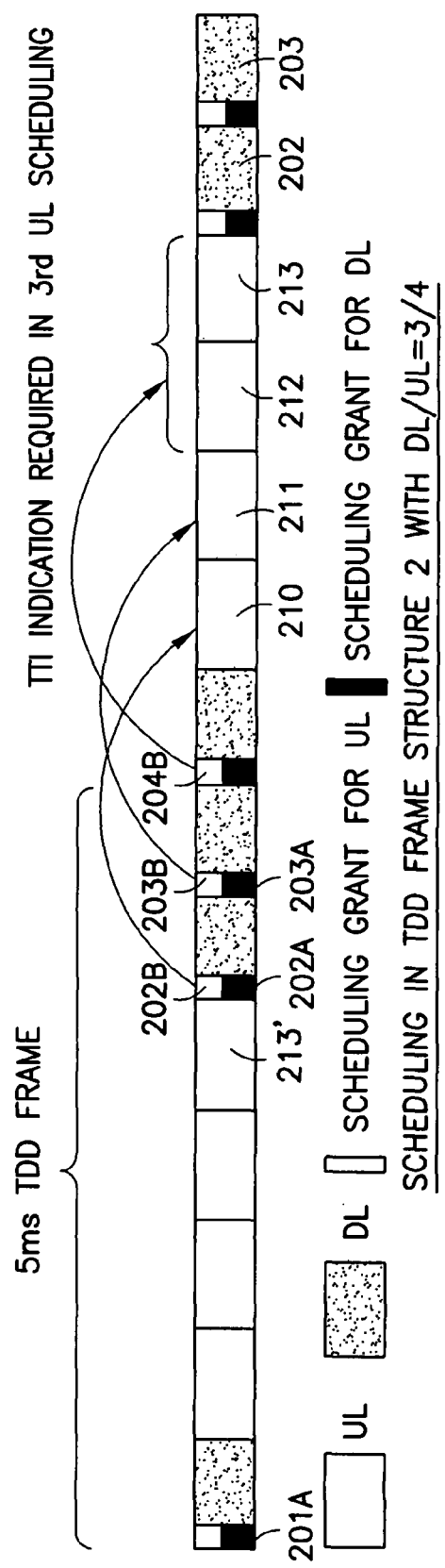
FIG. 2 is similar to FIG. 1 but illustrating an allocation of three downlink subframes and four uplink subframe (DL<UL) according to another aspect of the invention.
Figure 6:
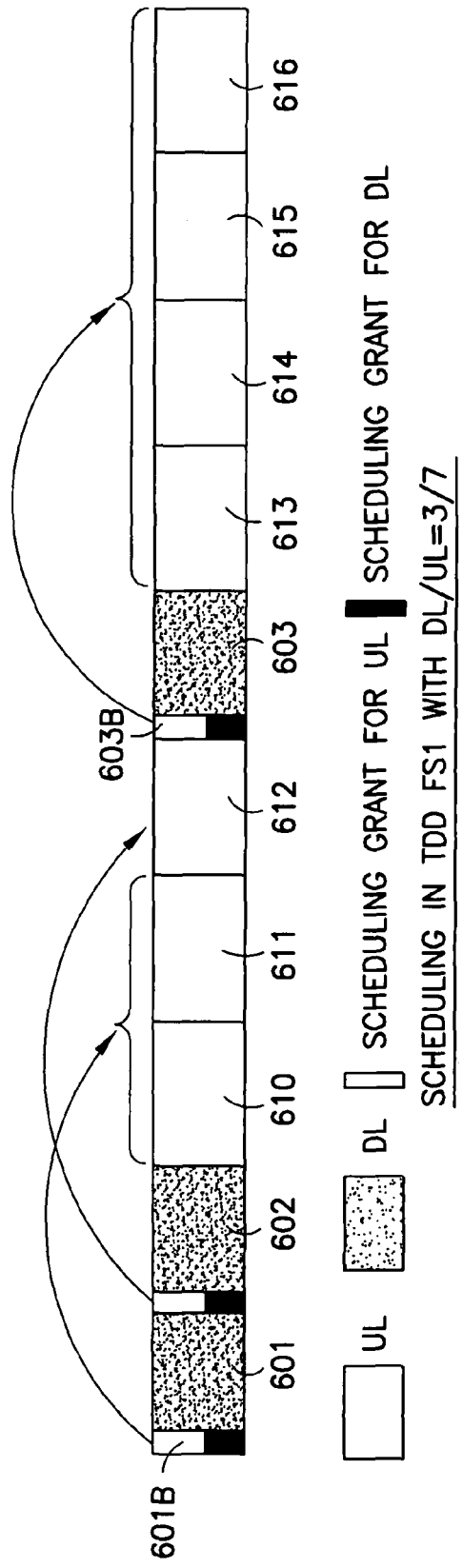
FIG. 6 is similar to FIG. 5 but illustrating an allocation of two downlink subframes and seven uplink subframes (DL<UL) according to the aspect of the invention used in FIG. 3A.

This first aspect of the invention is shown by example at FIG. 2-3 and 6 for various configurations of DL and UL subframes being scheduled in FS2 and FS1. First consider FIG. 2, a TDD FS2 with three DL subframes being scheduled, designated as 201, 202 and 203, and four UL subframes being scheduled, designated as 210, 211, 212 and 213. The DL subframes 201, 202 and 203 are scheduled in the DL scheduling grants 201A, 202A and 203A. The UL subframes are grouped into N groups, where N equals the number of DL subframes being scheduled, N=3 in this instance. As grouped in FIG. 2, the first and second groups have one UL subframe and the third group has two UL subframes. The first UL scheduling grant 202B schedules UEs for the first UL subframe 210. The second UL scheduling grant 203B schedules UEs for the second UL subframe 211. And the third UL scheduling grant 204B schedules UEs for the third group of UL subframes, which include both subframe 212 and 213. For the scheduling grants 202B and 203B for the first two UL subframes 210 and 211, no TTI indication is needed since there will be a one-to-one correspondence and implicit mapping when there is only one UL subframe in a particular group. For the scheduling grant 204B for the third group of UL subframes, which includes more than one UL subframe, the TTI indication is present and its bit length is one for the case of single TTI scheduling as shown, or it may be length two for the case where multi-TTI scheduling is allowed (a grant in one TTI grants resources in more than one TTI).

FIG. 3 shows an example of TDD FS2 with two DL subframes, designated 301 and 302 and scheduled by the DL grants 301A and 302A respectively, and five UL subframes designated as 310 through 314 scheduled by the UL grants 302B and 303B. Those five UL subframes are divided (aggregated) into two groups, since N=# of DL resources scheduled=2 in this example. The first group includes the first two UL subframes 310 and 311, and is scheduled by the UL grant 302B. The second group includes the remaining three UL subframes 312, 313 and 314. If only single-TTI scheduling grant is allowed, then the TTI indication length can be as little as one bit in the first UL scheduling grant 302B, and as little as two bits in the second UL scheduling grant 303B. If multi-TTI scheduling grant is supported, the TTI indications may then be a minimum of two and three bits respectively for those grants 302B, 303B.

Examples of TTI bit sequences and their meanings are shown below for the case where the network allows multi-TTI scheduling.

For a two-bit TTI indication:
   00: UE occupy 2 TTI, different resource and MCS;
   11: UE occupy 2 TTI, same resource and MCS;
   01: UE is allocated the 2nd TTI;
   10: UE is allocated the first TTI;

For a three-bit TTI indication:
   100: UE is allocated only the first TTI
   010: UE is allocated the second TTI
   001: UE is allocated the third TTI
   110: UE is allocated the first 2 TTIs, with the same frequency resource allocation and MCS;
   101: UE is allocated the first 2 TTIs, with different frequency resource allocation and MCS;
   011: UE is allocated the last 2 TTIs, with the same frequency resource allocation and MCS;
   000: UE is allocated the last 2 TTIs, with different frequency resource allocation and MCS;
   111: UE is allocated 3 TTIs, with the same frequency resource allocation and MCS;

Of course, the above bit sequences and meanings are exemplary and the meanings may be switched as compared to the listings above without departing from these teachings.

FIG. 6 shows an example of TDD FS1 with N=three DL subframes being scheduled, designated as 601, 602 and 603, and also seven UL subframes being scheduled, designated as 610 through 616. According to this first aspect of the invention, the seven UL subframes are divided into N=3 groups. For FIG. 6, the first group is UL subframes 610 and 611; the second group is UL subframe 612 only; and the third group is UL subframes 613 through 615. The first group is scheduled by the UL scheduling grant 601B sent in the first DL subframe 601; the second group is scheduled by the UL scheduling grant 602B sent in the second DL subframe 602, and the third group is scheduled by the UL scheduling grant 603B sent in the third DL subframe 603. Assuming that multi-TTI scheduling is allowed, the length of the TTI indication for the scheduling grants of the first two groups is as little as two (since the first group has two UL subframes) and the length of the TTI indication for the third group is as little as three. Without grouping, directly indicating the UL resource being allocated in a TTI indicator would require the maximum TTI indication length to be seven.

Figure 8:
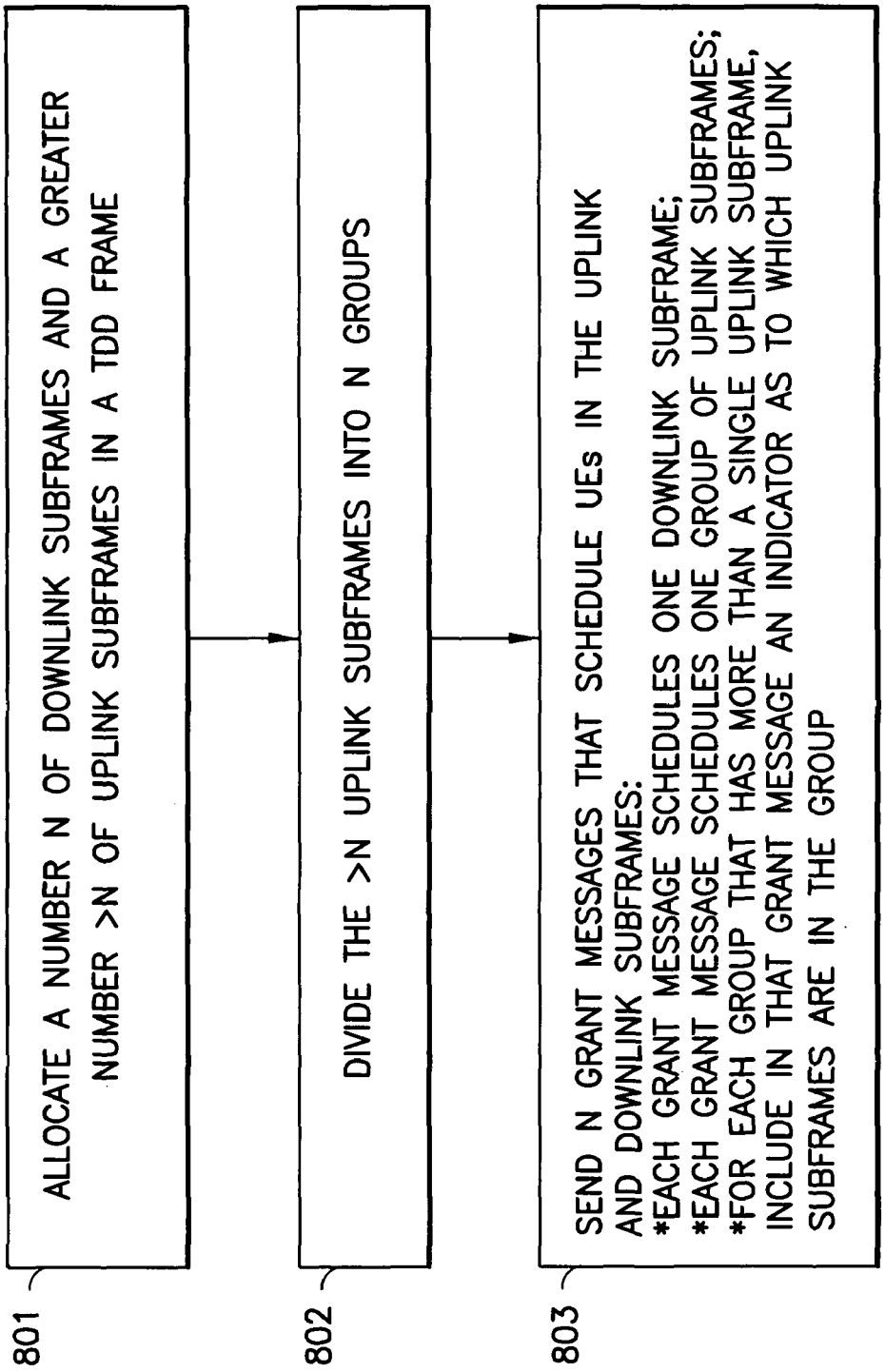
FIG. 8 is a flow diagram showing a method according to a first aspect of the invention.

FIG. 8 shows exemplary method steps for the first aspect of the invention detailed by example above. At 801 the Node B allocates a number N of DL subframes within a TDD frame for the downlink and a greater number>N of subframes within the TDD frame as uplink resources. Nothing yet is signalled or scheduled. At 802 the Node B then divides/groups the (more than N) UL subframes into only N groups, so necessarily there must be more than one UL subframe in at least one of those N groups (N is an integer). At block 803 the Node B transmits its scheduling grants, denoted in FIG. 8 as N grant messages. Each of those N grant messages schedules one of the DL subframes. Since there are N groups of UL subframes, then each of those same N grant messages also schedules one of the groups of UL subframes. As detailed above, for those groups that include more than one UL subframe, and preferably only those groups, there is also included in the corresponding grant message an indicator such as the TTI indicators noted above that indicate to the UE(s) which one(s) of the UL subframes are in the group being scheduled.

In the second aspect of the invention summarized above, appropriate for any equality or asymmetry of DL subframes and UL subframes, the paradigm noted in the background section is changed so that the downlink scheduling information is decoupled from the uplink control information. In this aspect, one logical UL scheduling grant channel is associated with each UL subframe. One of those logical UL scheduling grant channels is mapped to some physical subframes within the over all OFDM symbols conveying the scheduling information. Note that this is a one-to-one mapping between a UL sub frame and a logical UL scheduling grant channel. An advantage of this third option is there is no explicit time information needed in the scheduling grant itself. There may however be an added limit on the Node B scheduler by the predefined implicit mapping, as this is not seen to be quite as flexible as the second option noted above with the explicit mapping and the avoidance of blind detection by use of the new Cat0 bit sequence.

FIG. 4 shows an example of this second aspect of the invention, for TDD FS2 with two DL subframes designated 401 and 402, and five UL subframes designated 410 through 414. There are five logical UL scheduling grant channels, designated 410A, 411A, 412A, 413A and 414A. Each of these UL scheduling grant channels are predefined and each is associated with one UL subframe, so for example if a UE receives a UL scheduling grant on channel 413A, it knows from the association stored in its memory that it is a UL grant for the fifth subframe in the frame. In FIG. 4, that fifth subframe is designated 413. For other TTIs that disperse DL and UL subframes differently, merely failing to send a UL grant on one of the logical UL scheduling grant channels allows the Node B to schedule the associated subframe as a DL subframe. Since there is a one-to-one correspondence between logical UL scheduling grant channel and subframe, there is no need for an explicit TTI indication directing which UL subframe is being scheduled.

Figure 9:
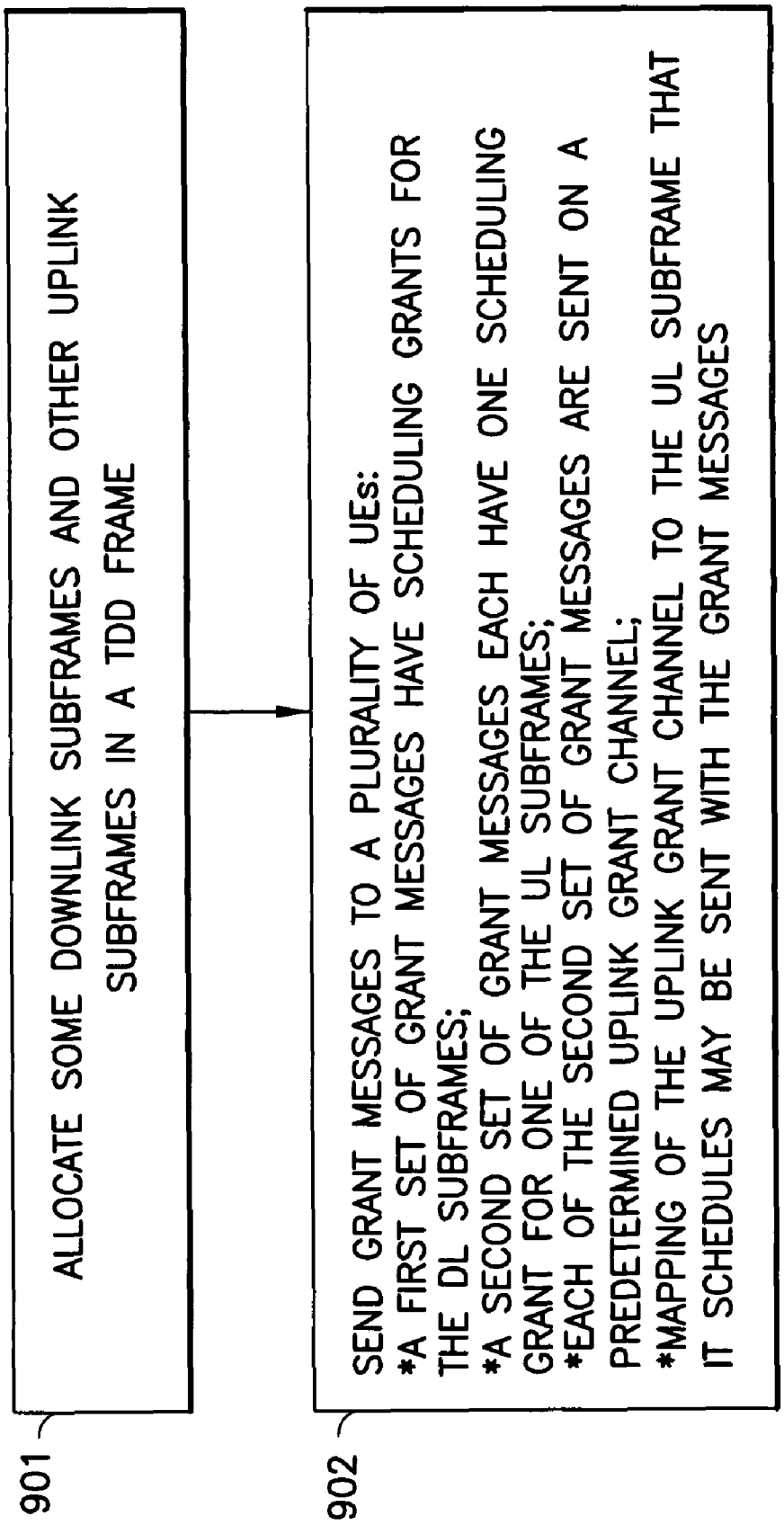
FIG. 9 is a flow diagram showing a method according to a second aspect of the invention.

This second aspect of the invention is shown at FIG. 9 as process or method steps. At block 901 the Node B allocates some subframes in a TDD frame as downlink subframes and others of the subframes as uplink subframes. Then at block 902 the Node B sends grant messages scheduling the UEs according to the UL or DL allocation. Here it is convenient to discuss those grant messages as being a first set and a second set of grant messages, mutually exclusive of one another. The first set of the grant messages includes the scheduling grants for the downlink subframes. Each grant message in the second set of grant messages includes a scheduling grant for one and only one of the UL subframes. But the grant messages of the second set are sent over the pre-determined logical UL scheduling grant channels, one scheduling grant (and hence one UL subframe) per UL scheduling grant channel. The mapping as to this one-to-one correspondence may be sent with the grant messages themselves, or it may be relatively static (e.g., channel A corresponds to first subframe in the frame, channel B to the second, etc. with the Node B choosing frame by frame which if any of those subframes will be used for UL or DL) and broadcast on a broadcast channel at much less frequent intervals, such as with system information.

Below are detailed different options by which scheduling grants may be given for the cases where more DL subframes are scheduled than UL subframes. While the above two aspects for the more challenging asymmetry may be extended to these cases also, some control signalling overhead can be saved by using different scheduling paradigms for the different asymmetry scenarios. In TDD frames with more DL subframes than UL subframes (or an equal number), such as TDD FS2 with six DL subframes and one UL subframe (DL/UL=6/1, or 5/2 or 4/3), and also such as TDD FS1 with nine DL subframes and one UL subframe (DL/UL=9/1, or 8/2 or 7/3 or 6/4), three different options are presented by which the Node B may send the UL scheduling grant.

In a first option, the UL scheduling grant for the ith UL subframe is sent in the ith DL subframe. The advantage of this first option is that there is an implicit mapping and no TTI indication in the UL scheduling grant is needed, so the control signaling overhead is quite minimal-just sending the implicit mapping in current use to the UEs. This is advantageously done sometime when the particular UE is in the Node B's cell, such as sending the mapping over a broadcast channel whereby the UE stores the mapping and accesses it anytime it receives a scheduling grant. However, the number of UEs that can be scheduled is limited by the size of the control resource in the ith DL subframe. In systems with many VOIP UEs, it is preferable that the Node B be able to schedule a large number of UEs to support the retransmission of VOIP.

In a second option where the number of DL subframes being scheduled is greater than or equal to the number of UL subframes being scheduled in a TDD frame/TTI, scheduling of the UL subframes is not restricted to map to any particular DL subframe and can instead be given in any of the DL subframes. In this second option instead there is a TTI indication in the UL scheduling grant. To avoid unnecessary blind detection by the UEs for the UL scheduling grants, the CCFI/Cat0 bit field is enhanced as compared to current practice with a new bit sequence that shows whether there is UL subframe scheduling in the ith DL subframe. When that bit sequence shows there is no UL subframe scheduled, then the UE need not engage in detection. This second option encompasses additional flexibility over the first option in that the UL scheduling grant can occur in any of the DL subframes.

Respecting the new bit sequence, the current agreement in LTE is that Cat0 has 2 bits and can provide four meanings. Recall that there is a maximum of three OFDM symbols available for DL control in LTE. In current LTE the Cat0 bits tell how many OFDM symbols are actually used in a particular instance for that DL control. Specifically, Cat0=00 indicates that one OFDM symbol is used for DL control signalling; Cat0=01 indicates two OFDM symbols are so used; and Cat0=10 indicates that three OFDM symbols are used. The second option uses the unused Cat0=11 bit sequence to indicate that there is no UL scheduling grant in the ith subframe, specifically, two OFDM symbols for DL control signalling and no UL scheduling grant.

Figure 5:
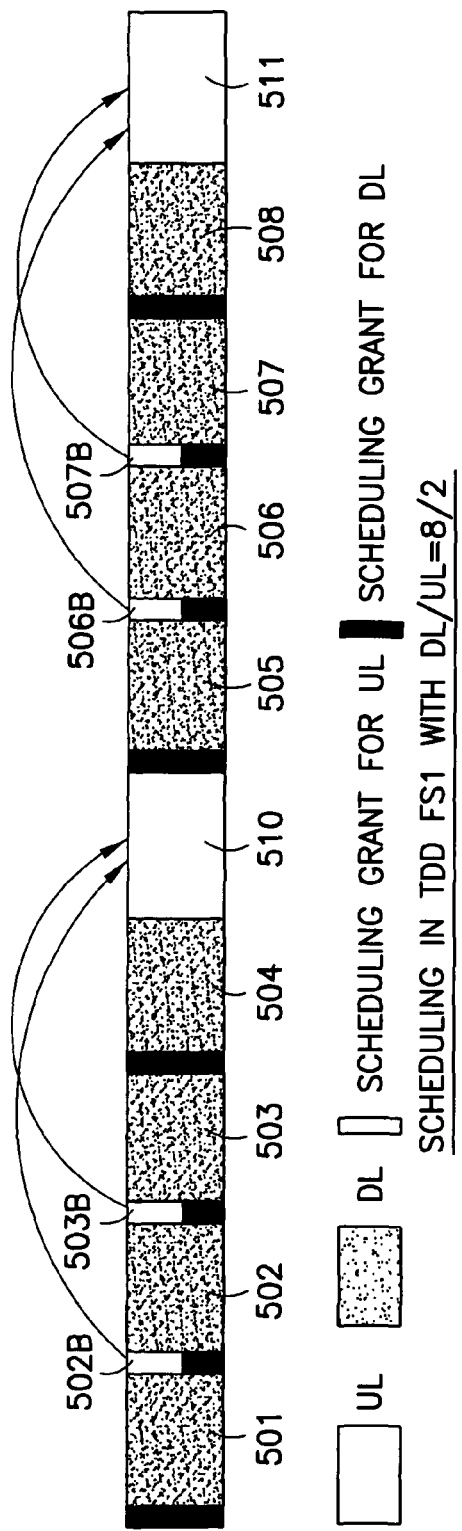
FIG. 5 is similar to FIG. 1 but for a different TDD frame structure (FS1) and allocating eight downlink subframes and two uplink subframes (DL>UL) according to the aspect of the invention used in FIG. 1.

This second option is shown in the signalling diagrams of FIGS. 1 and 5, FIG. 1 showing an example for TDD FS2 and FIG. 5 showing an example for TDD FS1. The legend in FIG. 1 applies also to FIGS. 2-6. The example of FIG. 1 has six DL subframes, designated 101 through 106 and scheduled by the respective DL scheduling grants 101A through 106A, and one UL subframe, designated 110 and scheduled by the UL scheduling grants 102B, 103B and 104B. The scheduling grant for the UL subframe 110 is sent in the first three DL subframes 102', 103' and 104' following the last scheduled UL subframe 110'. In this example, the scheduling grant for the single UL subframe 110 is spread among three DL subframes. Assume that two OFDM symbols in each of the grants in DL subframes 102' through 104' are used for scheduling and in each of those three DL subframes five UEs are scheduled on the UL subframe 110. Then in each of those three DL subframes 102' through 104', the Cat0 bit sequence is 01, indicating that there are two OFDM symbols being used. But since the Cat0=11 sequence is also available and not used in the control signals sent on those three DL subframes 102' through 104', the UEs know that there is also a UL subframe being scheduled. In the following two DL subframes 105' and 106', there is no scheduling grant for a UL subframe so the Cat0 bit sequence is 11 and the UEs know that the two OFDM symbols are for DL scheduling only. As was noted above and unlike the first option where a UL grant received in the ith DL subframe is always associated with the ith UL subframe, there need not be a one-to-one correspondence between the UL subframe being scheduled and the DL subframe in which the scheduling grant is received for this second option. The scheduled UEs send a UL ACK (acknowledge) message to confirm that they received the grant 102B, 103B, 104B for the UL subframe 110.

FIG. 5 shows this second option in a TDD FS1 format, where there are eight DL subframes, designated 501 through 508, and 2 UL subframes, designated 510 and 511, being scheduled. In LTE the subframes in FS1 are generally referred to as timeslots and in FS2 as subframes. FIG. 5 shows that the scheduling grant for the two UL subframes 510, 511 can be sent by the Node B in more than two DL subframes. In the example, the scheduling grant 502B and 503B for the first UL subframe 510 is spread among two DL subframes 502 and 503. Similarly, the scheduling grant 506B and 507B for the second of the UL subframes 511 is spread among DL subframes 506 and 507. The TTI indicator in those UL scheduling grants 502B, 503B, 506B, 507B maps explicitly to the scheduled UL subframe. The Cat0 bit sequence enables the UE to avoid blind detection where no UL grant is sent.

Figure 3B:
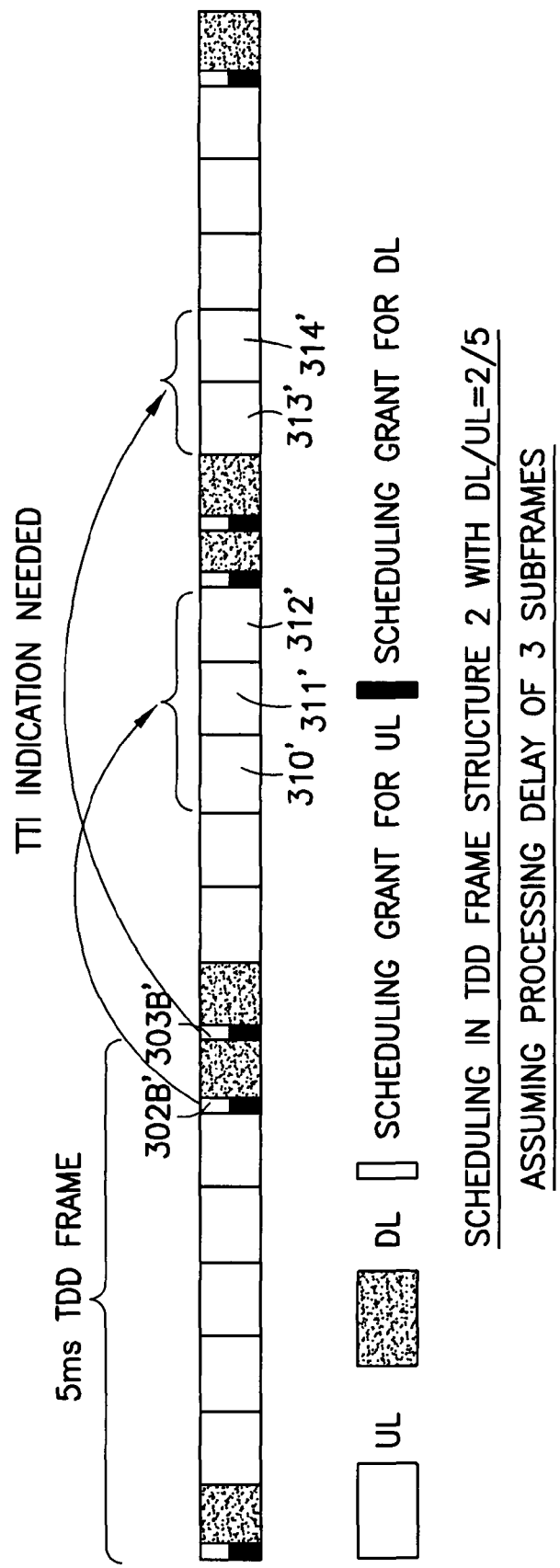
FIG. 3B is similar to FIG. 3A but adapted for a processing delay of three subframes.

All the Figures and examples above are based on the assumption of a one subframe processing delay. For other processing delays, the grouping can be generated in a similar way with the delay consideration. For illustrating a longer processing delay, another example is provided at FIG. 3B, which uses the same TDD frame as in FIG. 3A but assumes a three subframe processing delay. Reference numbers in FIG. 3B are primed as compared to FIG. 3A, and there are three subframes in the first group and two subframes in the second group as opposed to the two followed by three subframe groupings of FIG. 3A. Uplink scheduling grant 302B' is for UL subframes 310', 311' and 312', and uplink scheduling grant 303B' is for subframes 313' and 314' in FIG. 3B.

Figure 7:
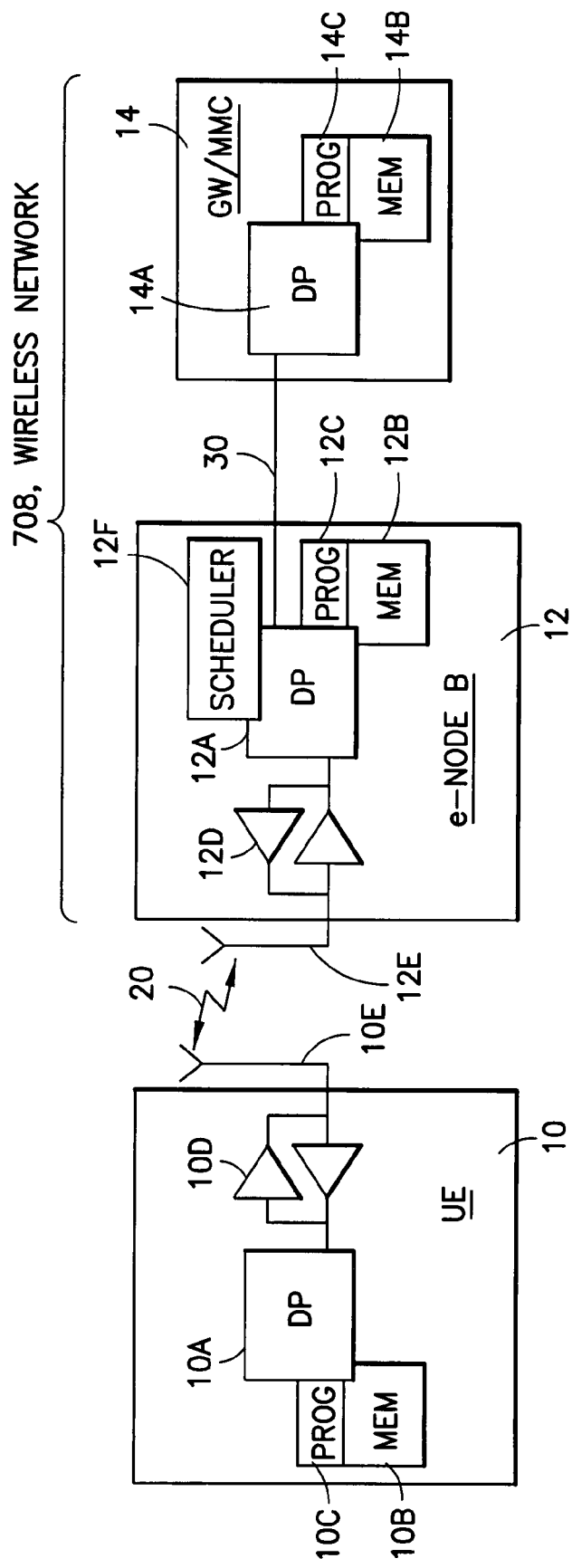
FIG. 7 shows a simplified block diagram of various electronic devices that are suitable for use in practicing the exemplary embodiments of this invention.

Reference is now made to FIG. 7 for illustrating a simplified block diagram of various electronic devices that are suitable for use in practicing the exemplary embodiments of this invention. In FIG. 7 a wireless network 708 is adapted for communication between a UE 10 and a Node B 12 (e-Node B). The network 708 may include a gateway GW/serving mobility entity MME/radio network controller RNC 14 or other radio controller function known by various terms in different wireless communication systems. The UE 10 includes a data processor (DP) 10A, a memory (MEM) 10B that stores a program (PROG) 10C, and a suitable radio frequency (RF) transceiver 10D coupled to one or more antennas 10E (one shown) for bidirectional wireless communications over one or more wireless links 20 with the Node B 12.

The Node B 12 also includes a DP 12A, a MEM 12B, that stores a PROG 12C, and a suitable RF transceiver 12D coupled to one or more antennas 12E. The Node B 12 may be coupled via a data path 30 (e.g., Iub or S1 interface) to the serving or other GW/MME/RNC 14. The GW/MME/RNC 14 includes a DP 14A, a MEM 14B that stores a PROG 14C, and a suitable modem and/or transceiver (not shown) for communication with the Node B 12 over the Iub link 30.

Also within the node B 12 is a scheduler 12F that schedule the various UEs under its control for the various UL and DL subframes. Once scheduled, the Node B sends messages to the UEs with the scheduling grants (typically multiplexing grants for multiple UEs in one message). These grants are sent over the particular channels noted with the specific embodiments detailed above. Generally, the Node B 12 of an LTE system is fairly autonomous in its scheduling and need not coordinate with the GW/MME 14 excepting during handover of one of its UEs to another Node B.

At least one of the PROGs 10C, 12C and 14C is assumed to include program instructions that, when executed by the associated DP, enable the electronic device to operate in accordance with the exemplary embodiments of this invention, as detailed above. Inherent in the DPs 10A, 12A, and 214A is a clock to enable synchronism among the various apparatus for transmissions and receptions within the appropriate time intervals and slots required, as the scheduling grants and the granted resources/subframes are time dependent.

The PROGs 10C, 12C, 14C may be embodied in software, firmware and/or hardware, as is appropriate. In general, the exemplary embodiments of this invention may be implemented by computer software stored in the MEM 10B and executable by the DP 10A of the UE 10 and similar for the other MEM 12B and DP 12A of the Node B 12, or by hardware, or by a combination of software and/or firmware and hardware in any or all of the devices shown.

In general, the various embodiments of the UE 10 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

For the aspects of this invention related to sending the scheduling grant to the UEs, embodiments of this invention may be implemented by computer software executable by a data processor of the Node B 12, such as the processor 12A shown, or by hardware, or by a combination of software and hardware. For the aspects of this invention related to receiving the scheduling grant and then using the granted resources (e.g., tuning to the granted subframe at the given time and receiving or sending on it), embodiments of this invention may be implemented by computer software executable by a data processor of the UE 10, such as the processor 10A shown, or by hardware, or by a combination of software and hardware. Further in this regard it should be noted that the various logical step descriptions above may represent program steps, or interconnected logic circuits, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A method comprising:
for a plurality of subframes in a time division duplex frame, by an apparatus comprising at least one processor, allocating a number N of the subframes as downlink subframes and a remaining number greater than N of the subframes as uplink subframes;
by the apparatus, dividing the uplink subframes into N groups, wherein at least one of the groups comprises more than one of the uplink subframes, a number of uplink subframes assigned to at least one of the groups being based at least in part on a ratio between a number of uplink subframes and a number of downlink subframes; and
by the apparatus, wirelessly sending to a plurality of user equipments N grant messages;
where each of the grant messages comprises a scheduling grant for one of the downlink subframes and a scheduling grant for each of the uplink subframes in one of the N groups;
wherein for each of the groups that comprises more than one of the uplink subframes, the respective grant message comprises an indicator that maps to individual ones of the uplink subframes in the respective group.

2. The method of claim 1, wherein for each of the groups that comprise only one of the uplink subframes, the respective grant message does not comprises an indicator that maps to only one uplink subframe of the respective-group.

3. The method of claim 1, wherein the indicator comprises a different number of bits depending on whether scheduling is for a single transmission time interval or for multiple transmission time intervals.

4. The method of claim 1, in which the apparatus comprises a Node B in an Evolved Universal Mobile Telecommunications System-Terrestrial Radio Access Network.

5. The method of claim 1, further comprising:
for a plurality of subframes in a next time division duplex frame, by the apparatus, allocating a number M of the subframes as downlink subframes and a remaining number N1 less than or equal to M of the subframes as uplink subframes;
by the apparatus, mapping each $i^{th}$ uplink subframe to an $i^{th}$ downlink subframe; and
by the apparatus, wirelessly sending N1 grant messages, each comprising a scheduling grant for one of the downlink subframes and one of the uplink subframes according to the mapping.

6. The method of claim 1, further comprising:
for a plurality of subframes in a next time division duplex frame, by the apparatus, allocating a number M of the subframes as downlink subframes and a remaining number N1 less than or equal to M of the subframes as uplink subframes; and
by the apparatus, wirelessly sending to the plurality of user equipments M grant messages;
where a grant message sent in an $i^{th}$ downlink subframe comprises a scheduling grant for the $i^{th}$ downlink subframe and a scheduling grant for one or multiple uplink subframes indicated by a transmission time interval indicator.

7. The method of claim 6, wherein a Cat0 bit sequence indicates whether there is a scheduling grant for both downlink and uplink subframes or for only downlink subframes.

8. A memory storing computer readable instructions executable by a digital data processor, to perform actions directed toward scheduling user equipments, the actions comprising:
for a plurality of subframes in a time division duplex frame, allocating a number N of the subframes as downlink subframes and a remaining number greater than N of the subframes as uplink subframes;
dividing the uplink subframes into N groups, wherein at least one of the groups comprises more than one of the uplink subframes, a number of uplink subframes assigned to at least one of the groups being based at least in part on a ratio between a number of uplink subframes and a number of downlink subframes;
wirelessly sending to a plurality of user equipments N grant messages;
where each of the grant messages comprise a scheduling grant for one of the downlink subframes and a scheduling grant for each of the uplink subframes in one of the N groups; wherein for each of the groups that comprise more than one of the uplink subframes, the respective grant message comprises an indicator that indicates which of the uplink subframes are in the group.

9. The memory of claim 8, further wherein for each of the groups that comprises only one of the uplink subframes, the grant message does not comprise an indicator that maps to individual ones of the uplink subframes in the respective group.

10. The memory of claim 8, wherein the indicator comprises a different number of bits depending on whether scheduling is in a single transmission time interval or for multiple transmission time intervals.

11. The memory of claim 8, the actions further comprising:
for a plurality of subframes in a next time division duplex frame, allocating a number M of the subframes as downlink subframes and a remaining number N1 less than or equal to M of the subframes as uplink subframes;
wirelessly sending to the plurality of user equipments M grant messages;
where a grant message sent in the $i^{th}$ downlink subframe comprises a scheduling grant for the $i^{th}$ downlink subframe and a scheduling grant for one or multiple uplink subframes indicated by a transmission time interval indicator.

12. The memory of claim 11, wherein a Cat0 bit sequence indicates whether there is a scheduling grant for both downlink and uplink subframes or for only downlink subframes.

13. An apparatus comprising:
a scheduler configured, for a plurality of subframes in a time division duplex frame, to allocate a number N of the subframes as downlink subframes and a remaining number greater than N of the subframes as uplink subframes;
a processor, coupled to a computer readable memory and to the scheduler, configured to divide the uplink subframes into N groups, wherein at least one of the groups comprises more than one of the uplink subframes, a number of uplink subframes assigned to at least one of the groups being based at least in part on a ratio between a number of uplink subframes and a number of downlink subframes;
a transmitter coupled to the processor configured to wirelessly send to a plurality of user equipments N grant messages;
where each of the grant messages comprise a scheduling grant for one of the downlink subframes and a scheduling grant for each of the uplink subframes in one of the N groups; and wherein for each of the groups that comprises more than one of the uplink subframes, the respective grant message comprises an indicator that maps to individual ones of the uplink subframes in the respective group.

14. The apparatus of claim 13, wherein the indicator comprises a different number of bits depending on whether scheduling is for one transmission time interval or for multiple transmission time intervals.

15. The apparatus of claim 13, wherein:
the scheduler is further configured, for a plurality of subframes in a next time division duplex frame, to allocate a number M of the subframes as downlink subframes and a remaining number N1 less than or equal to M of the subframes as uplink subframes; and
the transmitter is configured to wirelessly send to the plurality of user equipments M grant messages;
where the grant message sent in an $i^{th}$ downlink subframe comprises a scheduling grant for the $i^{th}$ downlink subframe and a scheduling grant for one or multiple uplink subframes indicated by a transmission time interval indicator.

16. The apparatus of claim 15, wherein a Cat0 bit sequence indicates whether there is a grant messages for both downlink and uplink subframes or for only downlink subframes.

17. The apparatus of claim 13 comprising a node B.

18. An apparatus comprising:
for a plurality of subframes in a time division duplex frame, scheduling means for allocating a number N of the subframes as downlink subframes and a remaining number greater than N of the subframes as uplink subframes;
processing means, coupled to a computer readable memory and to the scheduling means, for dividing the uplink subframes into N groups, wherein at least one of the groups comprises more than one of the uplink subframes, a number of uplink subframes assigned to at least one of the groups being based at least in part on a ratio between a number of uplink subframes and a number of downlink subframes;
transmitting means coupled to the processing means for wirelessly sending to a plurality of user equipments N grant messages;
where each of the grant messages comprise a scheduling grant for one of the downlink subframes and a scheduling grant for each of the uplink subframes in one of the N groups; and
for each of the groups that comprise more than one of the uplink subframes, the respective grant message comprises an indicator that maps to individual ones of the uplink subframes in the respective group.

19. The apparatus of claim 18, wherein:
the scheduling means comprises a software program stored on the memory;
the processing means comprises a digital data processor; and
the transmitting means comprises a transmitter.

20. A method comprising:
causing an apparatus comprising at least one processor to receive a scheduling grant message that comprises an indicator in a downlink subframe of a time division duplex frame, wherein the time division duplex frame comprises a number N of downlink subframes and a remaining number of uplink subframes, wherein the remaining number is greater than N, wherein the grant message comprises a scheduling grant for one of the downlink subframes and a scheduling grant for each of a plurality of the uplink subframes that comprise one of N groups of the uplink subframes, a number of uplink subframes assigned to at least one of the N groups being based at least in part on a ratio between a number of uplink subframes and a number of downlink subframes;
causing the apparatus to determine an individual one of the uplink subframes for which uplink subframe the scheduling grant is received in the group by mapping using the received indicator; and
causing the apparatus to transmit on the determined individual one of the uplink subframes.

21. The method of claim 20, wherein the indicator comprises a different number of bits depending on whether scheduling is for a single transmission time interval or for multiple transmission time intervals.

22. The method of claim 20, in which the apparatus comprises a user equipment in an Evolved Universal Mobile Telecommunications System-Terrestrial Radio Access Network.

23. A non-transitory computer readable memory storing computer readable instructions executable by a digital data processor to perform actions directed toward determining a user equipment resource allocation, the actions comprising:
receiving a scheduling grant message that comprises an indicator in a downlink subframe of a time division duplex frame, wherein the time division duplex frame comprises a number N of downlink subframes and a remaining number of uplink subframes, wherein the remaining number is greater than N, wherein the grant message comprises a scheduling grant for one of the downlink subframes and a scheduling grant for each of a plurality of the uplink subframes that comprise one of N groups of the uplink subframes, a number of uplink subframes assigned to at least one of the groups being based at least in part on a ratio between a number of uplink subframes and a number of downlink subframes;

determining an individual one of the uplink subframes for which uplink subframe the scheduling grant is received in the group by mapping using the indicator; and transmitting on the determined individual one of the uplink subframes.

24. An apparatus comprising:

a receiver configured to receive a scheduling grant message in a downlink subframe of a time division duplex frame that comprises a number N of downlink subframes and a remaining number of uplink subframes, wherein the remaining number is greater than N, wherein the grant message comprises an indicator, a scheduling grant for one of the downlink subframes and a scheduling grant for each of a plurality of the uplink subframes that comprise one of N groups of the uplink subframes, a number of uplink subframes assigned to at least one of the groups being based at least in part on a ratio between a number of uplink subframes and a number of downlink subframes;

a processor configured to determine an individual one of the uplink subframes for which the scheduling grant is received in the group by mapping using the received indicator; and a transmitter configured to transmit on the determined individual one of the uplink subframes.

25. The apparatus of claim 24, wherein the indicator comprises a different number of bits depending on whether scheduling is for a single transmission time interval or for multiple transmission time intervals.

26. The apparatus of claim 24, wherein the apparatus comprises a user equipment in an Evolved Universal Mobile Telecommunications System-Terrestrial Radio Access Network.

* * * * *